(12) United States Patent
Siler et al.

(10) Patent No.: US 7,267,616 B2
(45) Date of Patent: Sep. 11, 2007

(54) METHOD FOR MAKING A BALL-NUT AND METHOD FOR MAKING A BALL-SCREW

(75) Inventors: Ernest R. Siler, Springboro, OH (US); Ronald G. Smith, New Carlisle, OH (US); Kathleen Murphy, Wilmington, OH (US); David B. Drennen, Bellbrook, OH (US); Patrick A. Mescher, Bellbrook, OH (US); Thomas J. Bucholz, Sanford, MI (US)

(73) Assignee: Delphi Technologies, Inc., Troy, MI (US)

( * ) Notice: Subject to any disclaimer, the term of this patent is extended or adjusted under 35 U.S.C. 154(b) by 163 days.

(21) Appl. No.: 11/156,947

(22) Filed: Jun. 20, 2005

(65) Prior Publication Data

US 2006/0053919 A1    Mar. 16, 2006

Related U.S. Application Data

(60) Provisional application No. 60/604,876, filed on Aug. 27, 2004.

(51) Int. Cl.
*B21H 3/02* (2006.01)
(52) U.S. Cl. .............................. 470/8; 470/10; 470/18; 470/66
(58) Field of Classification Search .................. 470/9, 470/10, 18, 25, 66, 84, 106, 107; 29/898.063; 74/424.82, 424.84, 424.86; 72/370.21, 112

See application file for complete search history.

(56) References Cited

U.S. PATENT DOCUMENTS 4,080,011 A    3/1978    Wilke et al.
4,278,374 A    7/1981    Wolosianski et al.

(Continued)

FOREIGN PATENT DOCUMENTS

DE    102 14 481    10/1981

(Continued)

OTHER PUBLICATIONS

PCT Written Opinion dated Dec. 19, 2005.

(Continued)

*Primary Examiner*—Ed Tolan
(74) *Attorney, Agent, or Firm*—Scott A. McBain

(57) ABSTRACT

A method for making a ball-nut includes cutting a 360-degree closed-loop surface groove in the inner-circumferential wall portion of a ball-nut body using a whirling-type internal-diameter cutting machine. The closed-loop surface groove surrounds the longitudinal axis of the wall portion, is adapted for receiving a plurality of ball bearings, includes a helical-grooved portion substantially coaxially aligned with the longitudinal axis, and includes a crossover-grooved portion. A method for making a ball-screw includes cutting at least one 360-degree closed-loop surface groove in the outer-circumferential wall portion of a ball-screw body using a whirling-type external-diameter cutting machine. The closed-loop surface groove surrounds the longitudinal axis of the wall portion, is adapted for receiving a plurality of ball bearings, includes a helical-grooved portion substantially coaxially aligned with the longitudinal axis, and includes a cross-under-grooved portion.

20 Claims, 5 Drawing Sheets

U.S. PATENT DOCUMENTS

| | | | |
|---|---|---|---|
| 4,474,073 | A | 10/1984 | Blaurock et al. |
| 5,964,552 | A | 10/1999 | Larsen et al. |
| 5,988,007 | A | 11/1999 | Nishimura |
| 6,192,585 | B1 | 2/2001 | Buchanan, Jr. et al. |
| 6,334,370 | B1 * | 1/2002 | Sonoda et al. ............ 74/424.81 |
| 6,706,127 | B1 * | 3/2004 | Duggirala et al. ........... 148/570 |
| 6,813,970 | B2 * | 11/2004 | Siler et al. ............... 74/424.87 |
| 6,851,330 | B2 | 2/2005 | Buchanan, Jr. et al. |
| 2003/0024366 | A1 | 2/2003 | Ohkubo |
| 2003/0089188 | A1 | 5/2003 | Siler et al. |
| 2004/0083840 | A1 | 5/2004 | King et al. |

FOREIGN PATENT DOCUMENTS

| | | |
|---|---|---|
| DE | 39 30 900 | 3/1991 |
| GB | 526 735 | 9/1940 |

OTHER PUBLICATIONS

International Search Report dated Dec. 19, 2005.

Jaffe, George & Beck, Alexander, "Precise Moves Depend on Ball-Screw Threads", pp. 1-4, http://www.machinedesign.com/asp/articleLoader.asp?catId=2&path=D%3A%5Cinetpub%.

"The Cutting Process and Chip Formation" from Leistritz Corporation, Machine Tool Division, 165 Chestnut St., Allendale, NJ 07401.

Wehmann, Ralph, "The Whirling Process for Improved Worm Gears" from Leistritz Corporation (as seen in GEARSolutions magazine, pp. 1-8.

* cited by examiner

METHOD FOR MAKING A BALL-NUT AND METHOD FOR MAKING A BALL-SCREW

CROSS REFERENCE TO RELATED APPLICATIONS

The present application claims priority of U.S. Provisional Application No. 60/604,876 filed Aug. 27, 2004.

TECHNICAL FIELD

The present invention relates generally to ball nuts and ball screws, and more particularly to a method for making a ball-nut and to a method for making a ball-screw.

BACKGROUND OF THE INVENTION

Ball-screw-and-ball-nut assemblies have been used for over sixty years in a wide variety of applications. For example, conventional automotive braking systems include those which use a ball-screw-and-ball-nut assembly, wherein the brake booster serves as a housing, wherein the ball-screw is turned by a gear driven by an electric brake caliper motor, wherein the ball-nut is connected to the brake pad, and wherein rotation of the ball-screw axially moves the ball-nut. In some known ball-nut assemblies, an exterior tube extending above the ball-nut serves as a crossover for the ball bearings, as is known to the artisan. However, such exterior tubes demand close part tolerances which are expensive and difficult to achieve. Also, such protruding exterior tubes are not suitable for certain applications such as being housed in a brake caliper housing. In other known ball-nut assemblies, a crossover member insert is inserted into a radial through slot of the ball-nut from inside or outside the ball-nut. In one variation, a plurality of circumferentially-offset inserts are used wherein each insert provides access to load the ball bearings for, and defines a crossover-member portion of, a closed loop groove. The crossover member inserts and the exterior crossover tubes permit the ball bearings to crossover the helical threads of the ball-screw to keep the ball bearings in the closed loop grooves as is known to the artisan. The constant-depth helical groove on the exterior of the ball-screw is made using thread-making methods such as grinding, rolling, or whirling (wherein for whirling, the tool-head cutting angle and the tool-head eccentricity are fixed as the whirling-type external-diameter cutting machine cuts the thread). When using a crossover member, the helical groove on the interior wall of the ball-nut (not counting the crossover groove of the separate crossover member insert) is rough cut with a lathe, is sometimes followed by heat treating, and then is smoothed and sized with an internal grinder as is known to those skilled in the art.

Still, scientists and engineers continue to seek improved methods for making a ball nut and improved methods for making a ball screw.

SUMMARY OF THE INVENTION

A first method of the invention is for making a ball-nut. One step includes obtaining a ball-nut body including a substantially-cylindrical inner-circumferential wall portion having a longitudinal axis. Another step includes obtaining a whirling-type internal-diameter cutting machine. A further step includes cutting at least one 360-degree closed-loop surface groove in the inner-circumferential wall portion using the cutting machine, wherein the at-least-one 360-degree closed-loop surface groove surrounds the longitudinal axis, is adapted for receiving a plurality of ball bearings, includes a helical-grooved portion substantially coaxially aligned with the longitudinal axis, and includes a crossover-grooved portion.

A second method of the invention is for making a ball-nut. One step includes obtaining a ball-nut body including a substantially-cylindrical inner-circumferential wall portion having a longitudinal axis. Another step includes obtaining a whirling-type internal-diameter cutting machine having a cutting tool. A further step includes cutting two or more longitudinally-spaced-apart, 360-degree closed-loop surface grooves in the inner-circumferential wall portion using the cutting machine, wherein each surface groove surrounds the longitudinal axis, is adapted for receiving a plurality of ball bearings, includes a helical-grooved portion substantially coaxially aligned with the longitudinal axis, includes a crossover-grooved portion, and includes a transition-grooved portion located between the helical-grooved portion and the crossover-grooved portion, wherein longitudinally-adjacent crossover-grooved portions are circumferentially staggered, and wherein the cutting tool is angled to cut a narrower groove in the helical-grooved portion and the crossover-grooved portion than in the transition-grooved portion.

A third method of the invention is for making a ball-screw. One step includes obtaining a ball-screw body including a substantially-cylindrical outer-circumferential wall portion having a longitudinal axis. Another step includes obtaining a whirling-type external-diameter cutting machine. A further step includes cutting at least one 360-degree closed-loop surface groove in the outer-circumferential wall portion using the cutting machine, wherein the at-least-one 360-degree closed-loop surface groove surrounds the longitudinal axis, is adapted for receiving a plurality of ball bearings, includes a helical-grooved portion substantially coaxially aligned with the longitudinal axis, and includes a cross-under-grooved portion.

A fourth method of the invention is for making a ball-screw. One step includes obtaining a ball-screw body including a substantially-cylindrical outer-circumferential wall portion having a longitudinal axis. Another step includes obtaining a whirling-type external-diameter cutting machine having a cutting tool. A further step includes cutting a plurality N of longitudinally-spaced-apart, 360-degree closed-loop surface grooves in the outer-circumferential wall portion using the cutting machine, wherein each surface groove surrounds the longitudinal axis, is adapted for receiving a plurality of ball bearings, includes a helical-grooved portion substantially coaxially aligned with the longitudinal axis, includes a cross-under-grooved portion, and includes a transition-grooved portion disposed between the helical-grooved portion and the crossover-grooved portion, wherein longitudinally-adjacent cross-under-grooved portions are circumferentially staggered, and wherein the cutting tool is angled to cut a narrower groove in the helical-grooved portion and the cross-under-grooved portion than in the transition-grooved portion.

Several benefits and advantages are derived from one or more of the methods of the invention including avoiding the need for conventional crossover member inserts or exterior crossover tubes. In one experiment, a whirling-type external-diameter cutting machine was used to make a ball-screw having 360-degree closed-loop surface grooves in substantially 1.5 minutes instead of substantially 28 minutes using a lathe with milling head process. In this example, the cost of making a ball-screw-and-ball-nut assembly should be reduced from more than $24.00 to less then $7.00.

DESCRIPTION OF THE PREFERRED EMBODIMENTS

U.S. patent application Publication 2003/0089188 by Siler et al. entitled "Ball-Nut Assembly and Method for Making" and published May 15, 2003 is herein incorporated by reference.

Figure 1:
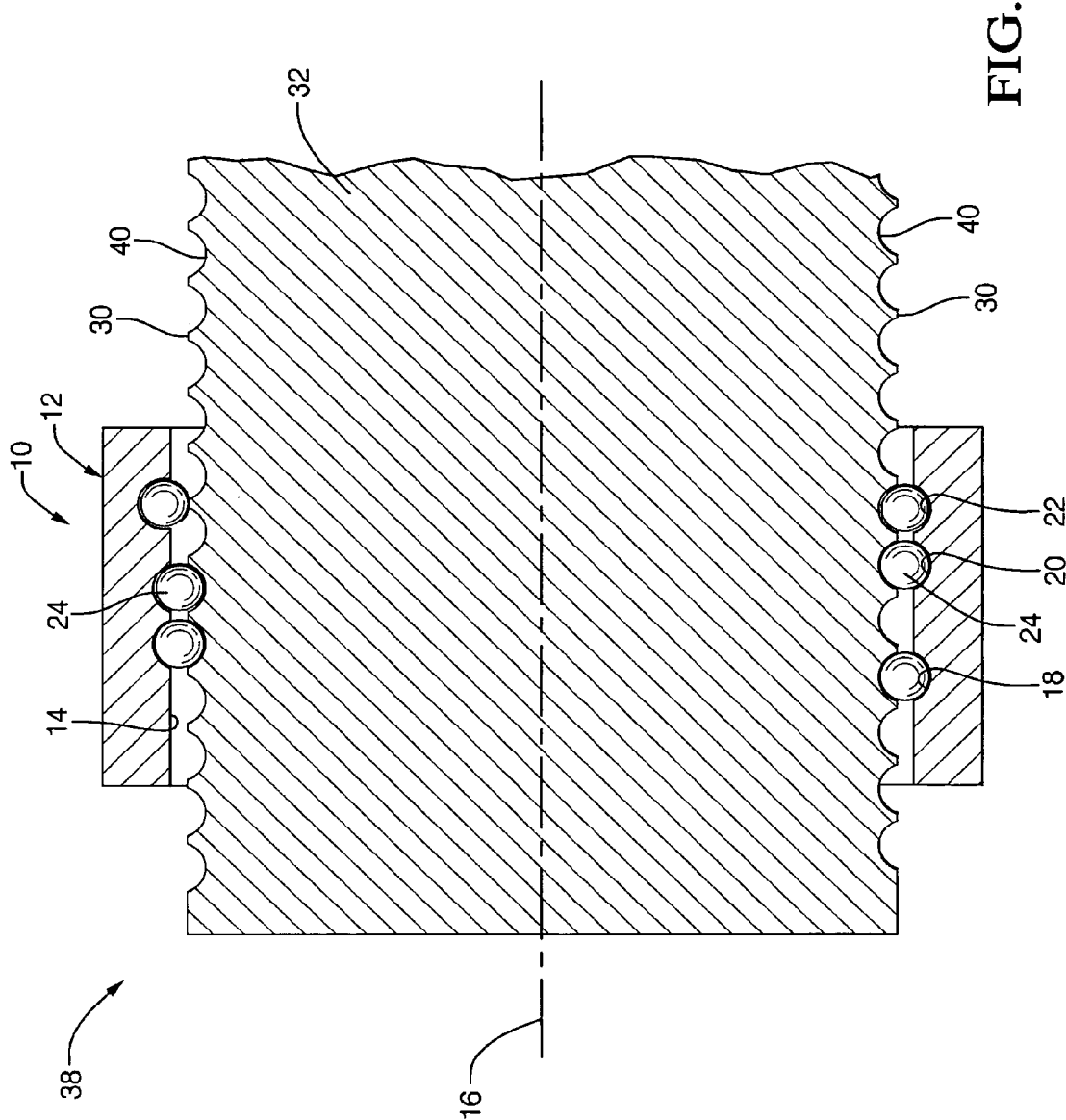
FIG. 1 is a cross-sectional view of a first embodiment of a ball-screw-and-ball-nut assembly of the invention.
Figure 2:
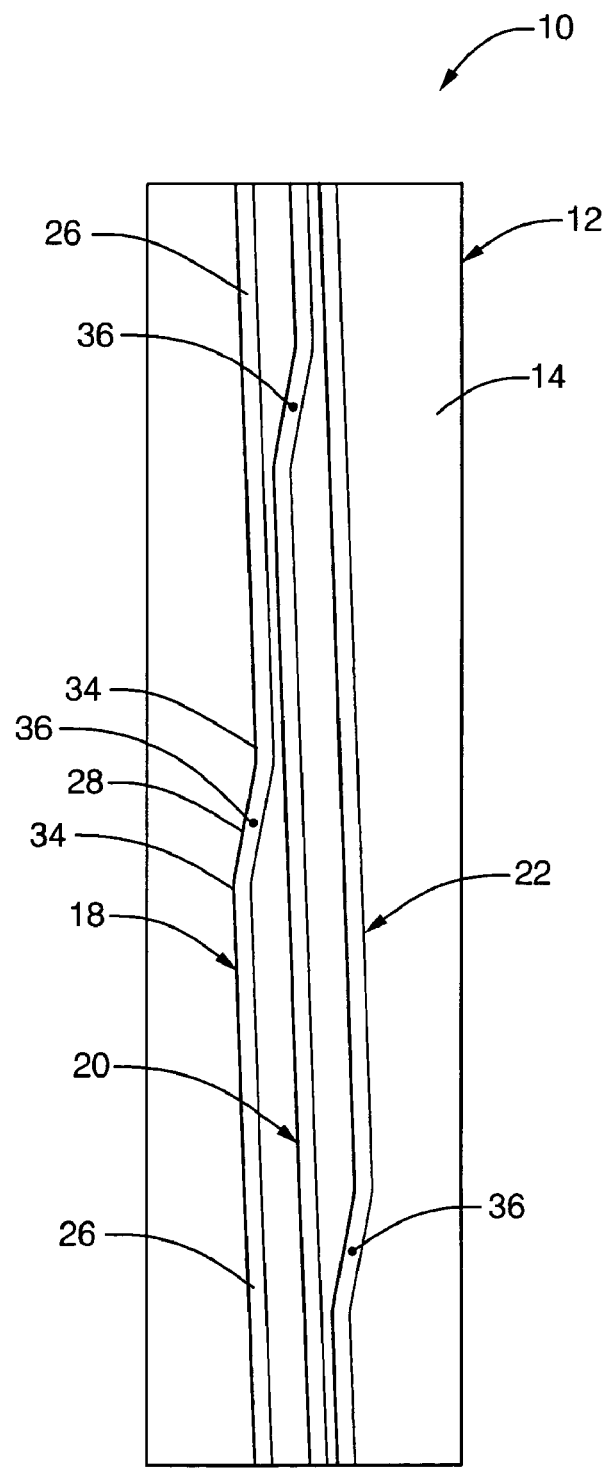
FIG. 2 is a view of the ball-nut of FIG. 1 cut open and laid flat.

Referring now to the drawings, FIGS. 1-2 illustrate a first embodiment of the present invention. A first expression of the embodiment shown in FIGS. 1-2 is for a ball-nut 10 including a ball-nut body 12. The ball-nut body 12 includes a substantially-cylindrical inner-circumferential wall portion 14 having a longitudinal axis 16 and having at least one 360-degree closed-loop continuous surface groove 18, 20, and 22 surrounding the longitudinal axis 16 and adapted for receiving a plurality of ball bearings 24. The at-least-one 360-degree closed-loop continuous surface groove 18, 20 and 22 includes a helical-grooved portion 26 substantially coaxially aligned with the longitudinal axis 16 and includes a crossover-grooved portion 28. It is noted that the crossover-grooved portion 28 is a grooved portion which allows the ball bearings 24 to crossover the outer threads of an installed ball-screw, as can be appreciated by those skilled in the art. In one utilization, the ball-nut 10 is used in an automotive braking system. Other utilizations of the ball-nut 10 are left to the artisan.

In one application of the first expression of the embodiment of FIGS. 1-2, the helical-grooved portion 26 has a first groove depth, and the crossover-grooved portion 28 has a second groove depth which is deeper than the first groove depth. In one example, the ball bearings 24, while in the crossover-grooved portion 28, are unloaded and ride over the outer threads 30 of the ball-screw 32, as is understood by the artisan.

In one implementation of the first expression of the embodiment of FIGS. 1-2, the at-least-one 360-degree closed-loop continuous surface groove 18, 20 and 22 includes a transition-grooved portion 34 disposed between the helical-grooved portion 26 and the crossover-grooved portion 28. In this implementation, the transition-grooved portion 34 has a wider groove than the helical-grooved portion 26 and the crossover-grooved portion 28. In one variation, the helical-grooved and crossover-grooved portions 26 and 28 have substantially the same groove width. In one example, the wider groove of the transition-grooved portion 34 helps unload the ball bearings 32 as they leave the helical-grooved portion 26 and enter the crossover-grooved portion 28, as can be appreciated by the artisan. In one modification, there is a transition-grooved portion 34 joining each end of the helical-grooved portion 26 to the crossover-grooved portion 28.

In one construction of the first expression of the embodiment of FIGS. 1-2, the helical-grooved portion 26 is a substantially 300-degree helical-grooved portion. In this construction, the crossover-grooved portion 28 (together with any one or two transition-grooved portions 34) spans substantially 60 degrees.

In one employment of the first expression of the embodiment of FIGS. 1-2, the at-least-one 360-degree closed-loop continuous surface groove 18, 20 and 22 includes a plurality of longitudinally-spaced-apart 360-degree closed-loop continuous surface grooves 18, 20 and 22, and the crossover-grooved portions 28 of longitudinally-adjacent surface grooves 18 & 20 and 20 & 22 are circumferentially staggered. In one variation, the plurality equals N, each crossover-grooved portion 28 has a midpoint 36, and the midpoints 36 of longitudinally-adjacent crossover-grooved portions (e.g., the crossover-grooved portions 28 of surface grooves 18 & 20 and 20 & 22) are circumferentially staggered by substantially 360/N degrees. In one example, equal staggering of crossover-grooved portions 28 provides even loading of the ball bearings 24 as can be appreciated by the artisan. In one illustration, N equals three. In another illustration, N equals four.

A second expression of the embodiment of FIGS. 1-2 is for a ball-nut 10 including a monolithic ball-nut body 12. The monolithic ball-nut body 12 includes a substantially-cylindrical inner-circumferential wall portion 14 having a longitudinal axis 16 and having a plurality N of 360-degree closed-loop surface grooves 18, 20 and 22 surrounding the longitudinal axis 16 and adapted for receiving a plurality of ball bearings 24. The N 360-degree closed-loop surface grooves 18, 20, 22 each include a helical-grooved portion 26 substantially coaxially aligned with the longitudinal axis 16 and include a crossover-grooved portion 28.

In one application of the second expression of the embodiment of FIGS. 1-2, each crossover-grooved portion 28 has a midpoint 36. In this application, the midpoints 36 of longitudinally-adjacent crossover-grooved portions 28 are circumferentially staggered by substantially 360/N degrees. It is noted that the applications, implementations, constructions, etc. of the first expression of the embodiment of FIGS. 1-2 are equally applicable to the second expression of the embodiment of FIGS. 1-2.

A first method of the invention is for making a ball-nut 10 and includes several steps. One step includes obtaining a ball-nut body 12 including a substantially-cylindrical inner-circumferential wall portion 14 having a longitudinal axis 16. Another step includes obtaining a whirling-type internal-diameter cutting machine. A further step includes cutting at least one 360-degree closed-loop surface groove 18, 20 and 22 in the inner-circumferential wall portion 14 using the cutting machine, wherein the at-least-one 360-degree closed-loop surface groove 18, 20 and 22 surrounds the longitudinal axis 16, is adapted for receiving a plurality of ball bearings 24, includes a helical-grooved portion 26 substantially coaxially aligned with the longitudinal axis 16, and includes a crossover-grooved portion 28.

Applicants were the first to realize that a whirling-type internal-diameter cutting machine could be used, in one example, to cut one or more 360-degree closed-loop surface grooves 18, 20 and 22 on an inner-circumferential wall portion 14 of a monolithic ball-nut body 12 thus avoiding the need for a separate crossover member insert or external tubes to recirculate the ball bearings 24. In one enablement of the first method, the whirling-type internal-diameter cutting machine is obtained from Leistritz Corporation, Machine Tool Division, 165 Chestnut Street, Allendale, N.J. 07401. In one process, the ball bearings 24 are conventionally installed using an arbor, as can be appreciated by those skilled in the art.

In one application of the first method, the helical-grooved portion 26 has a first groove depth, and the crossover-grooved portion 28 has a second groove depth which is deeper than the first groove depth. In one employment, the whirling-type internal-diameter cutting machine has a tool-head cutting angle and has a tool-head eccentricity, wherein the tool-head cutting angle and the tool-head eccentricity are fixed as the cutting step is cutting the helical-grooved portion of the at-least-one 360-degree closed-loop surface groove, and wherein the tool-head cutting angle and the tool-head eccentricity are dynamically changed as the cutting step is cutting the cross-under-grooved portion of the at-least-one 360-degree closed-loop surface groove. The tool-head cutting angle and eccentricity are more fully described later in reference to a third method of the invention involving a whirling-type external-diameter cutting machine.

In one implementation of the first method of the invention, the helical-grooved portion 26 is a substantially 300-degree helical-grooved portion. It is noted that the applications, implementations, constructions, etc. of the first and/or second expressions of the embodiment of FIGS. 1-2 are equally applicable to the first method of the invention.

A second method of the invention is for making a ball-nut 10 and includes several steps. One step includes obtaining a ball-nut body 12 including a substantially-cylindrical inner-circumferential wall portion 14 having a longitudinal axis 16. Another step includes obtaining a whirling-type internal-diameter cutting machine. A further step includes cutting a plurality N of longitudinally-spaced-apart, 360-degree closed-loop surface grooves 18, 20 and 22 in the inner-circumferential wall portion 14 using the cutting machine, wherein each surface groove 18, 20 and 22 surrounds the longitudinal axis 16, is adapted for receiving a plurality of ball bearings 24, includes a helical-grooved portion 26 substantially coaxially aligned with the longitudinal axis 16, includes a crossover-grooved portion 28, and includes a transition-grooved portion 34 disposed between the helical-grooved portion 26 and the crossover-grooved portion 28, wherein longitudinally-adjacent crossover-grooved portions 28 are circumferentially staggered, and wherein a narrower groove is cut in the helical-grooved portion 26 and the crossover-grooved portion 28 than in the transition-grooved portion 34.

In one application of the second method, each crossover-grooved portion 28 has a midpoint 36, and longitudinally-adjacent midpoints 36 are circumferentially staggered by substantially 360/N degrees. It is noted that the applications, implementations, constructions, etc. of the first and/or second expressions of the embodiment of FIGS. 1-2 and/or the first method of the invention are equally applicable to the second method of the invention.

A third expression of the embodiment of FIGS. 1-2 is for a ball-screw-and-ball-nut assembly 38 including a ball-screw 32, a ball-nut 12, and a plurality of ball bearings 24. The ball-screw 32 includes an outside helical groove 40. The ball-nut 12 includes a substantially-cylindrical inner-circumferential wall portion 14 having a longitudinal axis 16 and having at least one 360-degree closed-loop continuous surface groove 18, 20 and 22 surrounding the longitudinal axis 16 and the outside helical groove 40 of the ball-screw 32. The at-least-one 360-degree closed-loop continuous surface groove 18, 20 and 22 includes a helical-grooved portion 26 substantially coaxially aligned with the longitudinal axis 16 and includes a crossover-grooved portion 28. The ball bearings 24 are disposed between the outside helical groove 40 of the ball-screw 32 and the at-least-one 360-degree closed loop continuous surface groove 18, 20 and 22 of the inner-circumferential wall portion 14 of the ball-nut 10.

In one application of the third expression of the embodiment of FIGS. 1-2, the helical-grooved portion 26 has a first groove depth, and the crossover-grooved portion 28 has a second groove depth which is deeper than the first groove depth. In one enablement, the at-least-one 360-degree closed-loop continuous surface groove 18, 20 and 22 includes a transition-grooved portion 34 disposed between the helical-grooved portion 26 and the crossover-grooved portion 28, wherein the transition-grooved portion 34 has a wider groove than the helical-grooved portion 26 and the crossover-grooved portion 28.

In one employment of the third expression of the embodiment of FIGS. 1-2, the at-least-one 360-degree closed-loop continuous surface groove 18, 20 and 22 includes a plurality of longitudinally-spaced-apart 360-degree closed-loop continuous surface grooves 18, 20 and 22, wherein the crossover-grooved portions 28 of longitudinally-adjacent surface grooves 18 & 20 and 20 & 22 are circumferentially staggered. In one variation, the plurality equals N, each crossover-grooved portion 28 has a midpoint 36, and the midpoints 36 of longitudinally-adjacent crossover-grooved portions 28 are circumferentially staggered by substantially 360/N degrees.

It is noted that applications, implementations, constructions, etc. of the first and/or second expressions of the embodiment of FIGS. 1-2 and/or the first and/or second methods of the invention are equally applicable to the third expression of the embodiment of FIGS. 1-2.

Several benefits and advantages are derived from one or more of the expressions of the first embodiment and the first and second methods of the invention including avoiding the need for conventional crossover member inserts or exterior crossover tubes. The conventional process of making a ball-nut requiring a conventional crossover member insert would create a surface groove discontinuity in going from a helical-grooved portion of the ball-nut body to a crossover-grooved portion of the crossover member insert and would create a surface groove discontinuity in going from the crossover-grooved portion of the crossover member insert to the helical-grooved portion of the ball-nut body for each 360 discontinuous closed-loop surface groove. It is noted that circumferentially staggering the crossover portions should ensure that the ball-nut has a full circumferential load-bearing capability for the ball bearings, as can be appreciated by the artisan. Having a wider groove in the transition-grooved portion should help unload the ball bearings, as can be appreciated by those skilled in the art.

Figure 3:
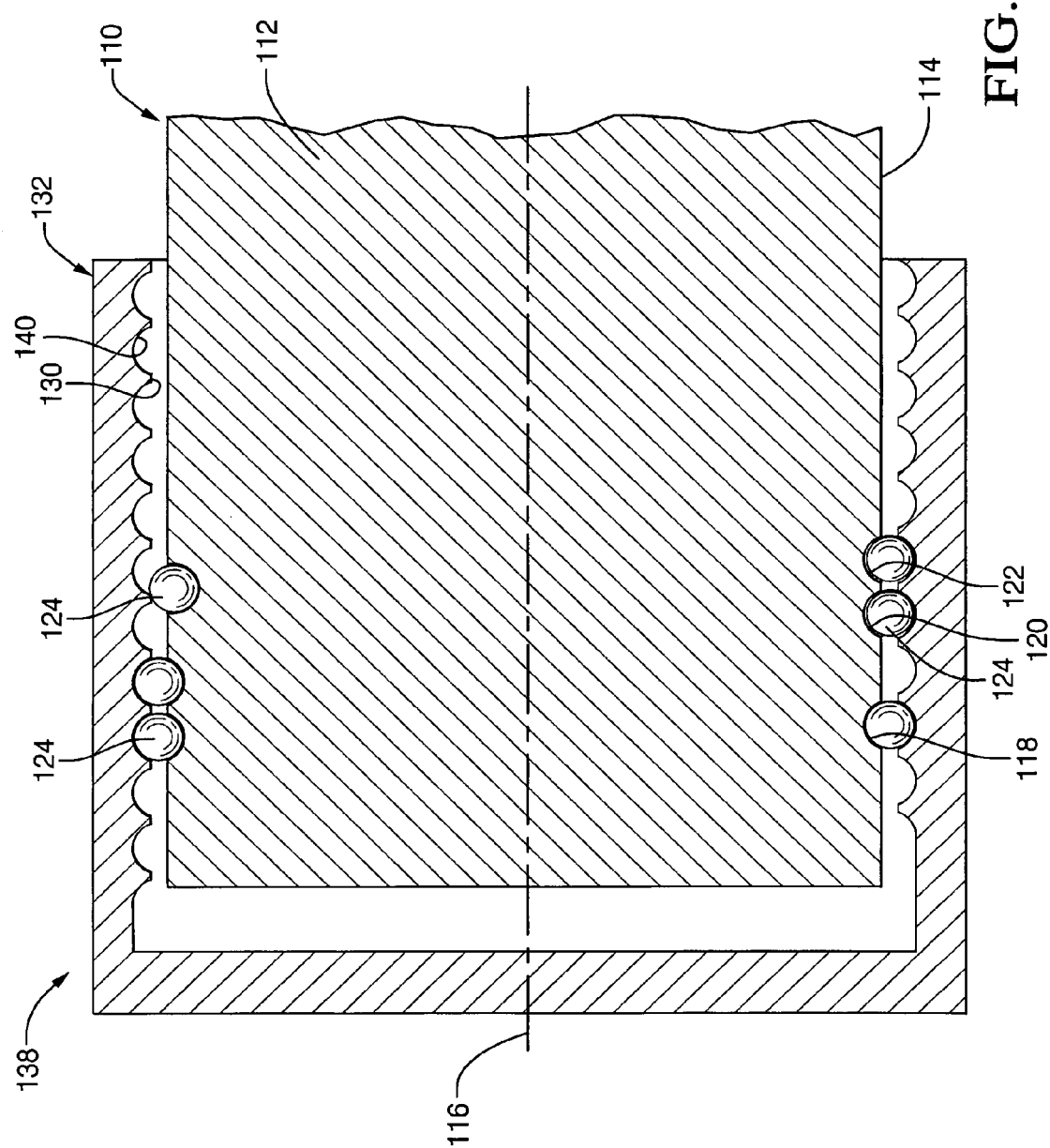
FIG. 3 is a cross-sectional view of a second embodiment of a ball-screw-and-ball-nut assembly of the invention.
Figure 4:
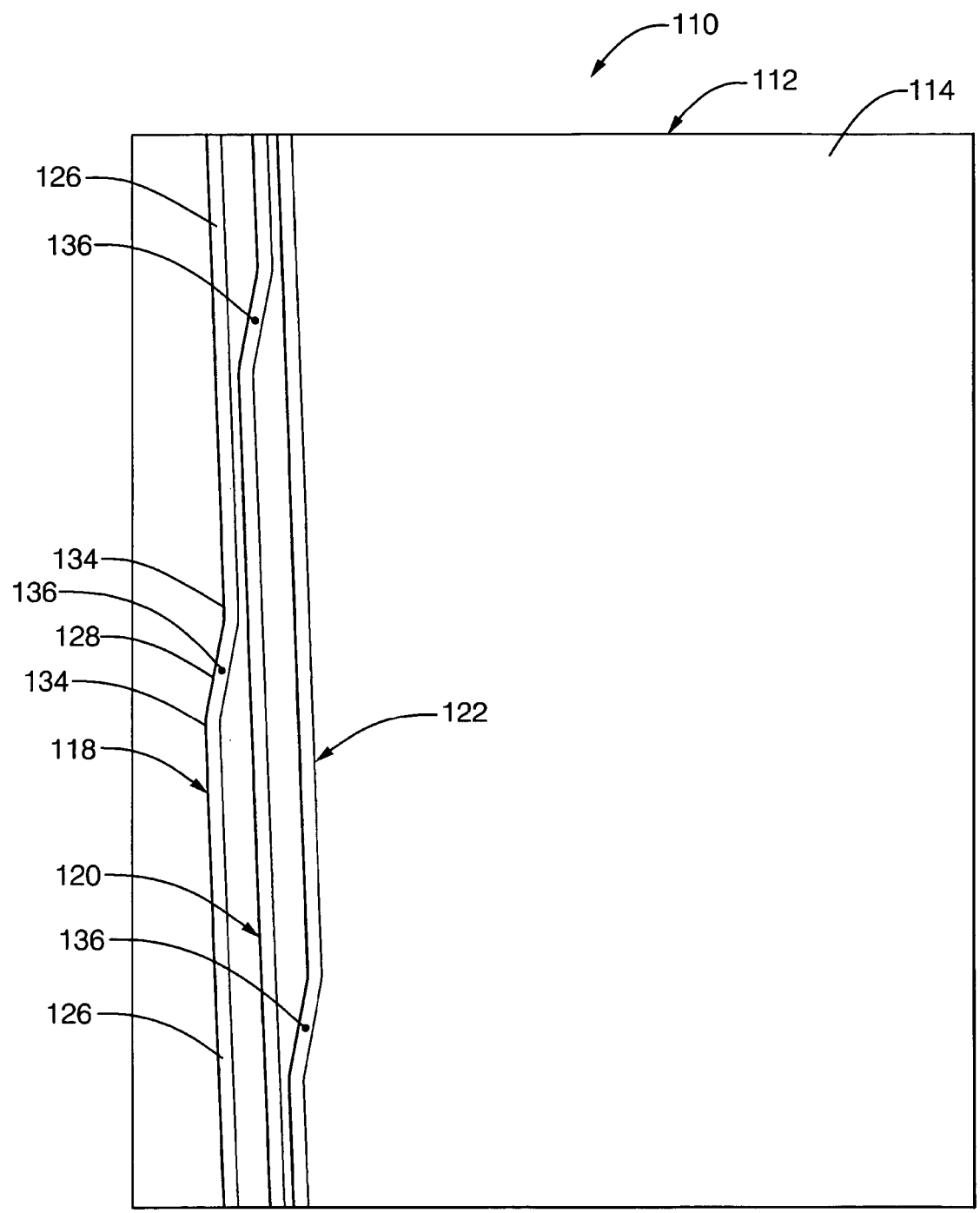
FIG. 4 is a view of the outer surface of the ball-screw of FIG. 3 peeled off and laid flat.

Referring again to the drawings, FIGS. 3-4 illustrate a second embodiment of the present invention. A first expression of the embodiment shown in FIGS. 3-4 is for a ball-screw 110 including a ball-screw body 112. The ball-screw body 112 includes a substantially-cylindrical outer-circumferential wall portion 114 having a longitudinal axis 116 and having at least one 360-degree closed-loop surface groove 118, 120, and 122 surrounding the longitudinal axis 116 and adapted for receiving a plurality of ball bearings 124. The at-least-one 360-degree closed-loop surface groove 118, 120 and 122 includes a helical-grooved portion 126 substantially coaxially aligned with the longitudinal axis 116 and includes a cross-under-grooved portion 128. A cross-under-grooved portion is a grooved portion which allows the ball bearings 124 to cross under the inner threads of an installed ball-nut. In one utilization, the ball-screw 110 is used in an automotive braking system. Other utilizations of the ball-screw 110 are left to the artisan.

In one application of the first expression of the embodiment of FIGS. 3-4, the helical-grooved portion 126 has a first groove depth, and the cross-under-grooved portion 128 has a second groove depth which is deeper than the first groove depth. In one example, the ball bearings 124, while in the cross-under-grooved portion 128, are unloaded and ride under the inner threads 130 of the ball-nut 132, as is understood by the artisan.

In one implementation of the first expression of the embodiment of FIGS. 3-4, the at-least-one 360-degree closed-loop surface groove 118, 120 and 122 includes a transition-grooved portion 134 disposed between the helical-grooved portion 126 and the cross-under-grooved portion 128. In this implementation, the transition-grooved portion 134 has a wider groove than the helical-grooved portion 126 and the cross-under-grooved portion 128. In one variation, the helical-grooved and cross-under-grooved portions 126 and 128 have substantially the same groove width. In one example, the wider groove of the transition-grooved portion 134 helps unload the ball bearings 132 as they leave the helical-grooved portion 126 and enter the cross-under-grooved portion 128, as can be appreciated by the artisan. In one modification, there is a transition-grooved portion 134 joining each end of the helical-grooved portion 126 to the cross-under-grooved portion 128.

In one construction of the first expression of the embodiment of FIGS. 3-4, the helical-grooved portion 126 is a substantially 300-degree helical-grooved portion. In this construction, the cross-under-grooved portion 128 (together with any one or two transition-grooved portions 134) spans substantially 60 degrees.

In one employment of the first expression of the embodiment of FIGS. 3-4, the at-least-one 360-degree closed-loop-surface groove 118, 120 and 122 includes a plurality of longitudinally-spaced-apart 360-degree closed-loop surface grooves 118, 120 and 122, and the cross-under-grooved portions 128 of longitudinally-adjacent surface grooves 118 & 120 and 120 & 122 are circumferentially staggered. In one variation, the plurality equals N, each cross-under-grooved portion 128 has a midpoint 136, and the midpoints 136 of longitudinally-adjacent cross-under-grooved portions (e.g., the cross-under-grooved portions 128 of surface grooves 118 & 120 and 120 & 122) are circumferentially staggered by substantially 360/N degrees. In one example, equal staggering of cross-under-grooved portions 128 provides even loading of the ball bearings 124 as can be appreciated by the artisan. In one illustration, N equals three. In another illustration, N equals four.

A second expression of the embodiment of FIGS. 3-4 is for a ball-screw 110 including a ball-screw body 112. The ball-screw body 112 includes a substantially-cylindrical outer-circumferential wall portion 114 having a longitudinal axis 116 and having a plurality N of 360-degree closed-loop surface grooves 118, 120 and 122 surrounding the longitudinal axis 116 and adapted for receiving a plurality of ball bearings 124. The N 360-degree closed-loop surface grooves 118, 120, 122 each include a helical-grooved portion 126 substantially coaxially aligned with the longitudinal axis 116 and include a cross-under-grooved portion 128.

In one application of the second expression of the embodiment of FIGS. 3-4, each cross-under-grooved portion 128 has a midpoint 136. In this application, the midpoints 136 of longitudinally-adjacent cross-under-grooved portions 128 are circumferentially staggered by substantially 360/N degrees. It is noted that the applications, implementations, constructions, etc. of the first expression of the embodiment of FIGS. 3-4 are equally applicable to the second expression of the embodiment of FIGS. 3-4.

A third method of the invention is for making a ball-screw 110 and includes several steps. One step includes obtaining a ball-screw body 112 including a substantially-cylindrical outer-circumferential wall portion 114 having a longitudinal axis 116. Another step includes obtaining a whirling-type external-diameter cutting machine. A further step includes cutting at least one 360-degree closed-loop surface groove 118, 120 and 122 in the outer-circumferential wall portion 114 using the cutting machine, wherein the at-least-one 360-degree closed-loop surface groove 118, 120 and 122 surrounds the longitudinal axis 116, is adapted for receiving a plurality of ball bearings 124, includes a helical-grooved portion 126 substantially coaxially aligned with the longitudinal axis 116, and includes a cross-under-grooved portion 128.

Applicants were the first to realize that a whirling-type external-diameter cutting machine could be used, in one example, to cut one or more 360-degree closed-loop surface grooves 118, 120 and 122 on an outer-circumferential wall portion 114 of a ball-screw body 112 thus avoiding the need for a separate crossover member insert or external tubes in the ball nut to recirculate the ball bearings 124. In one enablement of the third method of the invention, the whirling-type external-diameter cutting machine is obtained from Leistritz Corporation, Machine Tool Division, 165 Chestnut Street, Allendale, N.J. 07401. In one process, the ball bearings 124 are conventionally installed using an arbor, as can be appreciated by those skilled in the art.

In one application of the third method, the helical-grooved portion 126 has a first groove depth, and the cross-under-grooved portion 128 has a second groove depth which is deeper than the first groove depth. In one employment, the whirling-type external-diameter cutting machine has a tool-head cutting angle 142 and has a tool-head eccentricity 144, wherein the tool-head cutting angle and the tool-head eccentricity are fixed as the cutting step is cutting the helical-grooved portion of the at-least-one 360-degree closed-loop surface groove, and wherein the tool-head cutting angle and the tool-head eccentricity are dynamically changed as the cutting step is cutting the cross-under-grooved portion of the at-least-one 360-degree closed-loop surface groove.

Figure 5:
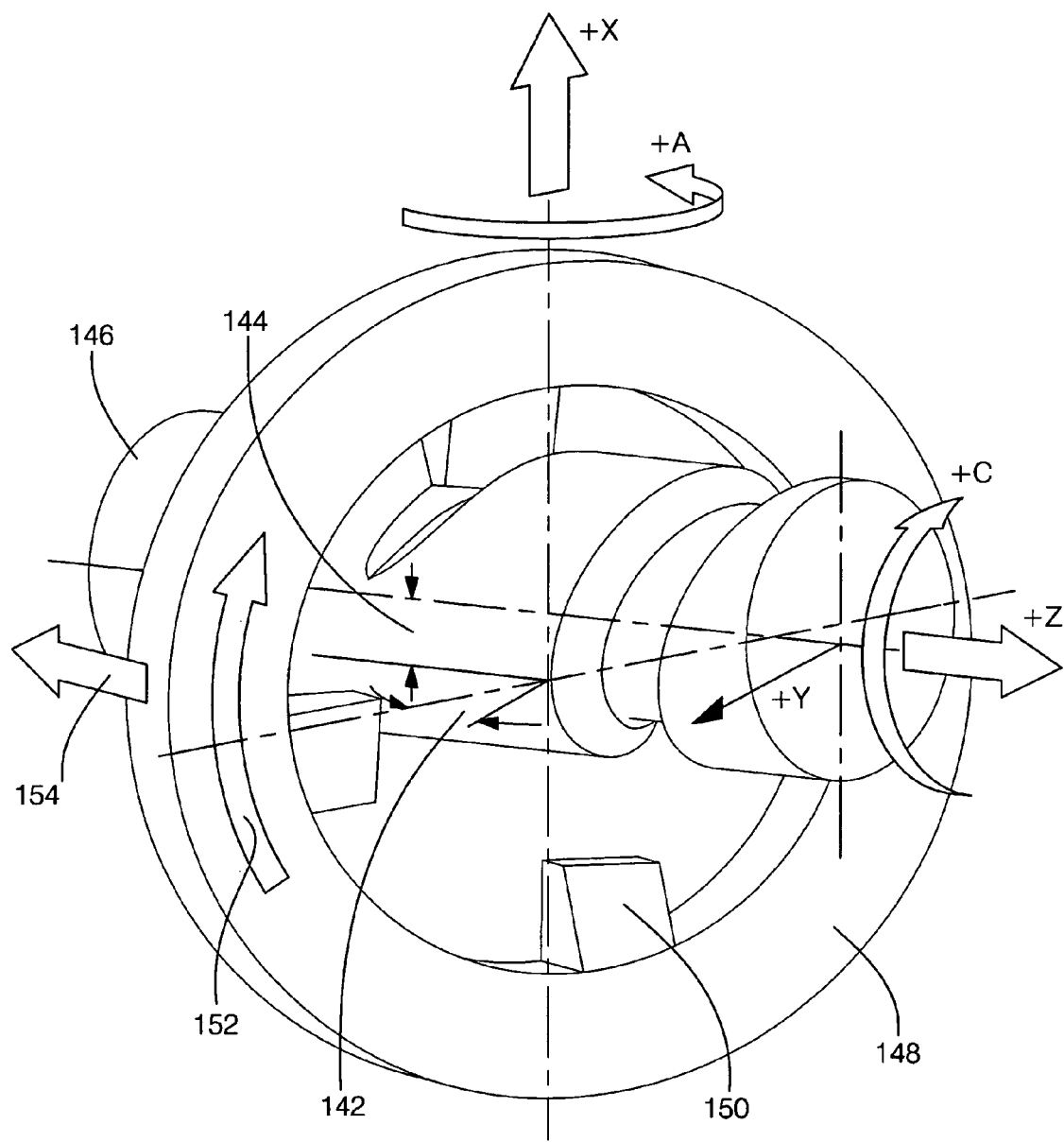
FIG. 5 is a schematic view of a tool-head (whirling ring) of a whirling-type external-diameter cutting machine cutting a surface groove in a workpiece which is to become the ball-screw shown in FIGS. 3-4.

The tool-head cutting angle 142 and the tool-head eccentricity 144 are defined in reference to FIG. 5. The tool-head cutting angle 142 determines surface groove pitch, and the tool-head eccentricity 144 determines surface groove depth. In FIG. 5, the workpiece 146 rotates along the C rotational axis about its longitudinal axis (the Z translational axis). The tool head (whirling ring) 148 supports the cutting tools 150 (such cutting tools being on the outside of the tool head for a whirling-type internal-diameter cutting machine, not shown). The tool head 148 rotates as shown by arrow 152 and translates as shown by arrow 154. During the cutting of the helical-grooved portion of a closed-loop surface groove, the tool-head cutting angle 142 (the angle of the longitudinal axis of the tool head 148 with respect to the longitudinal axis (the Z translational axis) of the workpiece 146 along rotational axis A about the X translational axis) and the tool-head eccentricity 144 (the offset of the center of the tool head 148 from the center of workpiece 146 along the X translational axis) are fixed. During the cutting of the cross-under-grooved portion of the closed-loop surface groove, the tool-head cutting angle 142 is dynamically changed to close the loop, and the tool-head eccentricity 144 is dynamically changed to increase the surface groove depth, as can be appreciated by those skilled in the art. It is noted that the tool head 148 (whirling ring) rotates at high speed around a slowly rotating workpiece 146.

In one implementation of the third method of the invention, the helical-grooved portion 126 is a substantially 300-degree helical-grooved portion. It is noted that the applications, implementations, constructions, etc. of the first and/or second expressions of the embodiment of FIGS. 3-4 are equally applicable to the third method of the invention.

A fourth method of the invention is for making a ball-screw 110 and includes several steps. One step includes obtaining a ball-screw body 112 including a substantially-cylindrical outer-circumferential wall portion 114 having a longitudinal axis 116. Another step includes obtaining a whirling-type external-diameter cutting machine having a cutting tool. A further step includes cutting a plurality N of longitudinally-spaced-apart, 360-degree closed-loop surface grooves 118, 120 and 122 in the outer-circumferential wall portion 114 using the cutting machine, wherein each surface groove 118, 120 and 122 surrounds the longitudinal axis 116, is adapted for receiving a plurality of ball bearings 124, includes a helical-grooved portion 126 substantially coaxially aligned with the longitudinal axis 116, includes a cross-under-grooved portion 128, and includes a transition-grooved portion 134 disposed between the helical-grooved portion 126 and the cross-under-grooved portion 128, wherein longitudinally-adjacent cross-under-grooved portions 128 are circumferentially staggered, and wherein a narrower groove is cut in the helical-grooved portion 126 and the cross-under-grooved portion 128 than in the transition-grooved portion 134.

In one application of the fourth method of the invention, each cross-under-grooved portion 128 has a midpoint 136, and longitudinally-adjacent midpoints 136 are circumferentially staggered by substantially 360/N degrees. It is noted that the applications, implementations, constructions, etc. of the first and/or second expressions of the embodiment of FIGS. 3-4 and/or the third method of the invention are equally applicable to the fourth method of FIGS. 3-4.

A third expression of the embodiment of FIGS. 3-4 is for a ball-screw-and-ball-nut assembly 138 including a ball-nut 132, a ball-screw 112, and a plurality of ball bearings 124. The ball-nut 132 includes an inside helical groove 140. The ball-screw 112 includes a substantially-cylindrical outer-circumferential wall portion 114 having a longitudinal axis 116 and having at least one 360-degree closed-loop surface groove 118, 120 and 122 surrounding the longitudinal axis 116 and surrounded by the inside helical groove 140 of the ball-nut 132. The at-least-one 360-degree closed-loop surface groove 118, 120 and 122 includes a helical-grooved portion 126 substantially coaxially aligned with the longitudinal axis 116 and includes a cross-under-grooved portion 128. The ball bearings 124 are disposed between the inside helical groove 140 of the ball-nut 132 and the at-least-one 360-degree closed loop surface groove 118, 120 and 122 of the outer-circumferential wall portion 114 of the ball-screw 110.

In one application of the third expression of the embodiment of FIGS. 3-4, the helical-grooved portion 126 has a first groove depth, and the cross-under-grooved portion 128 has a second groove depth which is deeper than the first groove depth. In one enablement, the at-least-one 360-degree closed-loop surface groove 118, 120 and 122 includes a transition-grooved portion 134 disposed between the helical-grooved portion 126 and the cross-under-grooved portion 128, wherein the transition-grooved portion 134 has a wider groove than the helical-grooved portion 126 and the cross-under-grooved portion 128.

In one employment of the third expression of the embodiment of FIGS. 3-4, the at-least-one 360-degree closed-loop surface groove 118, 120 and 122 includes a plurality of longitudinally-spaced-apart 360-degree closed-loop surface grooves 118, 120 and 122, wherein the cross-under-grooved portions 128 of longitudinally-adjacent surface grooves 118 & 120 and 120 & 122 are circumferentially staggered. In one variation, the plurality equals N, each cross-under-grooved portion 128 has a midpoint 136, and the midpoints 136 of longitudinally-adjacent cross-under-grooved portions 128 are circumferentially staggered by substantially 360/N degrees.

It is noted that applications, implementations, constructions, etc. of the first and/or second expressions of the embodiment of FIGS. 3-4 and/or the third and/or fourth methods of the invention are equally applicable to the third expression of the embodiment of FIGS. 3-4.

Several benefits and advantages are derived from one or more of the expressions of an embodiment of FIGS. 3-4 and the third and fourth methods of the invention including avoiding the need for conventional crossover member inserts or exterior crossover tubes for the ball nut. In one experiment, a whirling-type external-diameter cutting machine was used to make a ball-screw having 360-degree closed-loop surface grooves in substantially 1.5 minutes instead of substantially 28 minutes using a lathe with milling head process. In this example, the cost of making a ball-screw-and-ball-nut assembly should be reduced from more than $24.00 to less then $7.00. Circumferentially staggering the crossover portions ensures that the ball-nut has a full circumferential load-bearing capability for the ball bearings, as can be appreciated by the artisan. Having a wider groove in the transition-grooved portion helps unload the ball bearings as can be appreciated by those skilled in the art.

The following is a description of another embodiment of a ball-screw. In this embodiment, the ballscrew converts rotary motion to linear motion, wherein the ballscrew uses ball bearings to transfer rotary force between the threads on both the screw and the nut. In this embodiment, the ball bearings are the coupling between the screw and the nut to transfer perpendicular force to the nut, wherein, as the screw rotates, the helix on the screw thread (angle between the ball bearing and the thread) applies a force in a perpendicular direction (linear) from the screw thread through the ball bearings to the nut threads. In this embodiment, such as in an electric caliper application, the ballscrew is required to do the translation between the rotary motion of the motor and the required linear clamp force. The electric caliper and the ballscrew also must have the ability to back-drive which is the ability of the Ballscrew to return to a zero perpendicular force condition using only the spring force in the system generated from the clamp force (caliper housing). In back-driving the caliper spring force is pushing back through the piston, through the ball bearings, and into the thread helix of the screw which will cause the screw to rotate in the reverse loading direction until the perpendicular force is close to zero.

In this embodiment, the ball bearings between the nut and the screw freely translate through the helix, wherein any resistance to ball flow through the helix will reduce the overall efficiency of force transfer between the nut and the screw. It is noted that the resistance to ball flow is especially damaging during back-driving since the helix angle may not be ideal and the ball bearing will resist rotation. In this embodiment, the helix track design reduces the resistance of the ball bearing through the track helix. The ball bearing movement through the helix is comparable to the flow of a liquid in a closed circular tube. At any given section of the helix, the designer is concerned with the following: the force on the balls; the velocity of the balls; and the elevation of the circular tube. It is noted that the ball flow energy=potential energy (elevation)+kinetic energy (velocity)+flow energy (friction in track). In this embodiment, the ball flow energy is kept low for successful back-driving. The generated flow energy losses (friction in the track) is a primary factor for increased ball flow energy, as can be seen in a typical fluid flow model.

The foregoing description of several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

The invention claimed is:

1. A method for making a ball-nut comprising the steps of:
   a) obtaining a ball-nut body including a substantially-cylindrical inner-circumferential wall portion having a longitudinal axis;
   b) obtaining a whirling-type internal-diameter cutting machine; and
   c) cutting at least one 360-degree closed-loop surface groove in the inner-circumferential wall portion using the cutting machine, wherein the at-least-one 360-degree closed-loop surface groove surrounds the longitudinal axis, is adapted for receiving a plurality of ball bearings, includes a helical-grooved portion substantially coaxially aligned with the longitudinal axis, and includes a crossover-grooved portion.

2. The method of claim 1, wherein the helical-grooved portion has a first groove depth, and wherein the crossover-grooved portion has a second groove depth which is deeper than the first groove depth.

3. The method of claim 2, wherein the whirling-type internal-diameter cutting machine has a tool-head cutting angle and has a tool-head eccentricity, wherein the tool-head cutting angle and the tool-head eccentricity are fixed as step c) is cutting the helical-grooved portion of the at-least-one 360-degree closed-loop surface groove, and wherein the tool-head cutting angle and the tool-head eccentricity are dynamically changed as step c) is cutting the crossover-grooved portion of the at-least-one 360-degree closed-loop surface groove.

4. The method of claim 2, wherein the helical-grooved portion is a substantially 300-degree helical-grooved portion.

5. A method for making a ball-nut comprising the steps of:
   a) obtaining a ball-nut body including a substantially-cylindrical inner-circumferential wall portion having a longitudinal axis;
   b) obtaining a whirling-type internal-diameter cutting machine; and
   c) cutting a plurality N of longitudinally-spaced-apart, 360-degree closed-loop surface grooves in the inner-circumferential wall portion using the cutting machine, wherein each surface groove surrounds the longitudinal axis, is adapted for receiving a plurality of ball bearings, includes a helical-grooved portion substantially coaxially aligned with the longitudinal axis, includes a crossover-grooved portion, and includes a transition-grooved portion disposed between the helical-grooved portion and the crossover-grooved portion, wherein longitudinally-adjacent crossover-grooved portions are circumferentially staggered, and wherein a narrower groove is cut in the helical-grooved portion and the crossover-grooved portion than in the transition-grooved portion.

6. The method of claim 5, wherein each crossover-grooved portion has a midpoint, and wherein longitudinally-adjacent midpoints are circumferentially staggered by substantially 360/N degrees.

7. The method of claim 6, wherein each helical-grooved portion has a first groove depth, and wherein each crossover-grooved portion has a second groove depth which is deeper than the first groove depth.

8. The method of claim 7, wherein the whirling-type internal-diameter cutting machine has a tool-head cutting angle and has a tool-head eccentricity, wherein the tool-head cutting angle and the tool-head eccentricity are fixed as step c) is cutting each helical-grooved portion of the 360-degree closed-loop surface grooves, and wherein the tool-head cutting angle and the tool-head eccentricity are dynamically changed as step c) is cutting each crossover-grooved portion of the 360-degree closed-loop surface grooves.

9. The method of claim 8, wherein each helical-grooved portion is a substantially 300-degree helical-grooved portion.

10. The method of claim 7, wherein each helical-grooved portion is a substantially 300-degree helical-grooved portion.

11. A method for making a ball-screw comprising the steps of:
    a) obtaining a ball-screw body including a substantially-cylindrical outer-circumferential wall portion having a longitudinal axis;
    b) obtaining a whirling-type external-diameter cutting machine; and
    c) cutting at least one 360-degree closed-loop surface groove in the outer-circumferential wall portion using the cutting machine, wherein the at-least-one 360-degree closed-loop surface groove surrounds the longitudinal axis, is adapted for receiving a plurality of ball bearings, includes a helical-grooved portion substantially coaxially aligned with the longitudinal axis, and includes a cross-under-grooved portion.

12. The method of claim 11, wherein the helical-grooved portion has a first groove depth, and wherein the cross-under-grooved portion has a second groove depth which is deeper than the first groove depth.

13. The method of claim 12, wherein the whirling-type external-diameter cutting machine has a tool-head cutting angle and has a tool-head eccentricity, wherein the tool-head cutting angle and the tool-head eccentricity are fixed as step c) is cutting the helical-grooved portion of the at-least-one 360-degree closed-loop surface groove, and wherein the tool-head cutting angle and the tool-head eccentricity are dynamically changed as step c) is cutting the cross-under-grooved portion of the at-least-one 360-degree closed-loop surface groove.

14. The method of claim 12, wherein the helical-grooved portion is a substantially 300-degree helical-grooved portion.

15. A method for making a ball-screw comprising the steps of:
a) obtaining a ball-screw body including a substantially-cylindrical outer-circumferential wall portion having a longitudinal axis;
b) obtaining a whirling-type external-diameter cutting machine having a cutting tool; and
c) cutting a plurality N of longitudinally-spaced-apart, 360-degree closed-loop surface grooves in the outer-circumferential wall portion using the cutting machine, wherein each surface groove surrounds the longitudinal axis, is adapted for receiving a plurality of ball bearings, includes a helical-grooved portion substantially coaxially aligned with the longitudinal axis, includes a cross-under-grooved portion, and includes a transition-grooved portion disposed between the helical-grooved portion and the cross-under-grooved portion, wherein longitudinally-adjacent cross-under-grooved portions are circumferentially staggered, and wherein the cutting tool is angled to cut a narrower groove in the helical-grooved portion and the cross-under-grooved portion than in the transition-grooved portion.

16. The method of claim 15, wherein each cross-under-grooved portion has a midpoint, and wherein longitudinally-adjacent midpoints are circumferentially staggered by substantially 360/N degrees.

17. The method of claim 16, wherein each helical-grooved portion has a first groove depth, and wherein each cross-under-grooved portion has a second groove depth which is deeper than the first groove depth.

18. The method of claim 17, wherein the whirling-type external-diameter cutting machine has a tool-head cutting angle and has a tool-head eccentricity, wherein the tool-head cutting angle and the tool-head eccentricity are fixed as step c) is cutting each helical-grooved portion of the 360-degree closed-loop surface grooves, and wherein the tool-head cutting angle and the tool-head eccentricity are dynamically changed as step c) is cutting each cross-under-grooved portion of the 360-degree closed-loop surface grooves.

19. The method of claim 18, wherein each helical-grooved portion is a substantially 300-degree helical-grooved portion.

20. The method of claim 17, wherein each helical-grooved portion is a substantially 300-degree helical-grooved portion.

* * * * *